United States Patent
Larson et al.

(10) Patent No.: US 7,302,083 B2
(45) Date of Patent: Nov. 27, 2007

(54) METHOD OF AND SYSTEM FOR SHARP OBJECT DETECTION USING COMPUTED TOMOGRAPHY IMAGES

(75) Inventors: Gregory L. Larson, Newton, MA (US); Sergey Simanovsky, Brookline, MA (US); Zhengrong Ying, Wakefield, MA (US); Carl R. Crawford, Brookline, MA (US)

(73) Assignee: Analogic Corporation, Peabody, MA (US)

( * ) Notice: Subject to any disclaimer, the term of this patent is extended or adjusted under 35 U.S.C. 154(b) by 722 days.

(21) Appl. No.: 10/883,199

(22) Filed: Jul. 1, 2004

(65) Prior Publication Data
US 2006/0002585 A1    Jan. 5, 2006

(51) Int. Cl.
G06K 9/00 (2006.01)
G01N 23/04 (2006.01)

(52) U.S. Cl. .............. 382/103; 382/154; 382/190; 378/57

(58) Field of Classification Search .............. None
See application file for complete search history.

(56) References Cited

U.S. PATENT DOCUMENTS

| | | | |
|---|---|---|---|
| 4,759,047 A | 7/1988 | Donges et al. | |
| 4,884,289 A | 11/1989 | Glockmann et al. | |
| 5,132,998 A | 7/1992 | Tsutsui et al. | |
| 5,182,764 A | 1/1993 | Peschmann et al. | |
| 5,247,561 A | 9/1993 | Kotowski | |
| 5,319,547 A | 6/1994 | Krug et al. | |
| 5,367,552 A | 11/1994 | Peschmann et al. | |
| 5,473,657 A | 12/1995 | McKenna | |
| 5,490,218 A | 2/1996 | Krug et al. | |
| 5,802,134 A | 9/1998 | Larson et al. | |
| 5,881,122 A | 3/1999 | Crawford et al. | |
| 5,887,047 A | 3/1999 | Bailey et al. | |
| 5,901,198 A | 5/1999 | Crawford et al. | |
| 5,909,477 A | 6/1999 | Crawford et al. | |
| 5,932,874 A | 8/1999 | Legg et al. | |
| 5,937,028 A | 8/1999 | Tybinkowski et al. | |
| 5,949,842 A | 9/1999 | Schafer et al. | |
| 5,970,113 A | 10/1999 | Crawford et al. | |
| 5,982,843 A | 11/1999 | Bailey et al. | |
| 5,982,844 A | 11/1999 | Tybinkowski et al. | |
| 6,026,143 A | 2/2000 | Simanovsky et al. | |
| 6,026,171 A | 2/2000 | Hiraoglu et al. | |
| 6,035,014 A | 3/2000 | Hiraoglu et al. | |
| 6,067,366 A | 5/2000 | Simanovsky et al. | |
| 6,075,871 A | 6/2000 | Simanovsky et al. | |
| 6,076,400 A | 6/2000 | Bechwati et al. | |

(Continued)

FOREIGN PATENT DOCUMENTS

DE    3150306    12/1981

*Primary Examiner*—Bhavesh M Mehta
*Assistant Examiner*—Charles Kim
(74) *Attorney, Agent, or Firm*—McDermott Will & Emery LLP

(57) ABSTRACT

A method of and a system for sharp object detection using computed tomography images are provided. The method comprises identifying voxels corresponding to individual objects; performing eigen-analysis and generating eigen-projection of an identified object; computing an axial concavity ratio of the identified object; computing a pointness measurement of the identified object; computing a flat area of the identified object; calculating a sharpness score of the identified object; and declaring the identified object as a threat if the sharpness score is greater than a pre-defined threshold.

14 Claims, 6 Drawing Sheets

U.S. PATENT DOCUMENTS

| | | |
|---|---|---|
| 6,078,642 A | 6/2000 | Simanovsky et al. |
| 6,091,795 A | 7/2000 | Schafer et al. |
| 6,108,396 A | 8/2000 | Bechwati et al. |
| 6,111,974 A | 8/2000 | Hiraoglu et al. |
| 6,128,365 A | 10/2000 | Bechwati et al. |
| 6,195,444 B1 | 2/2001 | Simanovsky et al. |
| 6,256,404 B1 | 7/2001 | Gordon et al. |
| 6,272,230 B1 | 8/2001 | Hiraoglu et al. |
| 6,345,113 B1 | 2/2002 | Crawford et al. |
| 6,687,326 B1 | 2/2004 | Bechwati et al. |
| 6,721,387 B1 | 4/2004 | Naidu et al. |
| 7,072,440 B2 * | 7/2006 | Mario et al. .................. 378/57 |
| 2004/0174959 A1 * | 9/2004 | Green ........................ 378/146 |
| 2007/0147586 A1 * | 6/2007 | Scheinman .................. 378/57 |

* cited by examiner

METHOD OF AND SYSTEM FOR SHARP OBJECT DETECTION USING COMPUTED TOMOGRAPHY IMAGES

RELATED APPLICATIONS

This patent application and/or patents are related to the following co-pending U.S. applications and/or issued U.S. patents, of the same assignee as the present application, the contents of which are incorporated herein in their entirety by reference:

"Nutating Slice CT Image Reconstruction Apparatus and Method," invented by Gregory L. Larson, et al., U.S. application Ser. No. 08/831,558, filed on Apr. 9, 1997, now U.S. Pat. No. 5,802,134, issued on Sep. 1, 1998;

"Computed Tomography Scanner Drive System and Bearing," invented by Andrew P. Tybinkowski, et al., U.S. application Ser. No. 08/948,930, filed on Oct. 10, 1997, now U.S. Pat. No. 5,982,844, issued on Nov. 9, 1999;

"Air Calibration Scan for Computed Tomography Scanner with Obstructing Objects," invented by David A. Schafer, et al., U.S. application Ser. No. 08/948,937, filed on Oct. 10, 1997, now U.S. Pat. No. 5,949,842, issued on Sep. 7, 1999;

"Computed Tomography Scanning Apparatus and Method With Temperature Compensation for Dark Current Offsets," invented by Christopher C. Ruth, et al., U.S. application Ser. No. 08/948,928, filed on Oct. 10, 1997, now U.S. Pat. No. 5,970,113, issued on Oct. 19, 1999;

"Computed Tomography Scanning Target Detection Using Non-Parallel Slices," invented by Christopher C. Ruth, et al., U.S. application Ser. No. 08/948,491, filed on Oct. 10, 1997, now U.S. Pat. No. 5,909,477, issued on Jun. 1, 1999;

"Computed Tomography Scanning Target Detection Using Target Surface Normals," invented by Christopher C. Ruth, et al., U.S. application Ser. No. 08/948,929, filed on Oct. 10, 1997, now U.S. Pat. No. 5,901,198, issued on May 4, 1999;

"Parallel Processing Architecture for Computed Tomography Scanning System Using Non-Parallel Slices," invented by Christopher C. Ruth, et al., U.S. application Ser. No. 08/948,697, filed on Oct. 10, 1997, U.S. Pat. No. 5,887,047, issued on Mar. 23, 1999;

"Computed Tomography Scanning Apparatus and Method For Generating Parallel Projections Using Non-Parallel Slice Data," invented by Christopher C. Ruth, et al., U.S. application Ser. No. 08/948,492, filed on Oct. 10, 1997, now U.S. Pat. No. 5,881,122, issued on Mar. 9, 1999;

"Computed Tomography Scanning Apparatus and Method Using Adaptive Reconstruction Window," invented by Bernard M. Gordon, et al., U.S. application Ser. No. 08/949,127, filed on Oct. 10, 1997, now U.S. Pat. No. 6,256,404, issued on Jul. 3, 2001;

"Area Detector Array for Computed Tomography Scanning System," invented by David A Schafer, et al., U.S. application Ser. No. 08/948,450, filed on Oct. 10, 1997, now U.S. Pat. No. 6,091,795, issued on Jul. 18, 2000;

"Closed Loop Air Conditioning System for a Computed Tomography Scanner," invented by Eric Bailey, et al., U.S. application Ser. No. 08/948,692, filed on Oct. 10, 1997, now U.S. Pat. No. 5,982,843, issued on Nov. 9, 1999;

"Measurement and Control System for Controlling System Functions as a Function of Rotational Parameters of a Rotating Device," invented by Geoffrey A. Legg, et al., U.S. application Ser. No. 08/948,493, filed on Oct. 10, 1997, now U.S. Pat. No. 5,932,874, issued on Aug. 3, 1999;

"Rotary Energy Shield for Computed Tomography Scanner," invented by Andrew P. Tybinkowski, et al., U.S. application Ser. No. 08/948,698, filed on Oct. 10, 1997, now U.S. Pat. No. 5,937,028, issued on Aug. 10, 1999;

"Apparatus and Method for Detecting Sheet Objects in Computed Tomography Data," invented by Muzaffer Hiraoglu, et al., U.S. application Ser. No. 09/022,189, filed on Feb. 11, 1998, now U.S. Pat. No. 6,111,974, issued on Aug. 29, 2000;

"Apparatus and Method for Eroding Objects in Computed Tomography Data," invented by Sergey Simanovsky, et al., U.S. application Ser. No. 09/021,781, filed on Feb. 11, 1998, now U.S. Pat. No. 6,075,871, issued on Jun. 13, 2000;

"Apparatus and Method for Combining Related Objects in Computed Tomography Data," invented by Ibrahim M. Bechwati, et al., U.S. application Ser. No. 09/022,060, filed on Feb. 11, 1998, now U.S. Pat. No. 6,128,365, issued on Oct. 3, 2000;

"Apparatus and Method for Detecting Sheet Objects in Computed Tomography Data," invented by Sergey Simanovsky, et al., U.S. application Ser. No. 09/022,165, filed on Feb. 11, 1998, now U.S. Pat. No. 6,025,143, issued on Feb. 15, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400, issued on Jun. 20, 2000;

"Apparatus and Method for Correcting Object Density in Computed Tomography Data," invented by Ibrahim M. Bechwati, et al., U.S. application Ser. No. 09/022,354, filed on Feb. 11, 1998, now U.S. Pat. No. 6,108,396, issued on Aug. 22, 2000;

"Apparatus and Method for Density Discrimination of Objects in Computed Tomography Data Using Multiple Density Ranges," invented by Sergey Simanovsky, et al., U.S. application Ser. No. 09/021,889, filed on Feb. 11, 1998, now U.S. Pat. No. 6,078,642, issued on Jun. 20, 2000;

"Apparatus and Method for Detection of Liquids in Computed Tomography Data," invented by Muzaffer Hiraoglu, et al., U.S. application Ser. No. 09/022,064, filed on Feb. 11, 1998, now U.S. Pat. No. 6,026,171, issued on Feb. 15, 2000;

"Apparatus and Method for Optimizing Detection of Objects in Computed Tomography Data," invented by Muzaffer Hiraoglu, et al., U.S. application Ser. No. 09/022,062, filed on Feb. 11, 1998, now U.S. Pat. No. 6,272,230, issued on Aug. 7, 2001;

"Multiple-Stage Apparatus and Method for Detecting Objects in Computed Tomography Data," invented by Muzaffer Hiraoglu, et al., U.S. application Ser. No. 09/022,164, filed on Feb. 11, 1998, now U.S. Pat. No. 6,035,014, issued on Mar. 7, 2000;

"Apparatus and Method for Detecting Objects in Computed Tomography Data Using Erosion and Dilation of Objects," invented by Sergey Simanovsky, et al., U.S. application Ser. No. 09/022,204, filed on Feb. 11, 1998, now U.S. Pat. No. 6,067,366, issued on May 23, 2000;

"Apparatus and Method for Processing Object Data in Computed Tomography Data using Object Projections," invented by Carl R. Crawford, et al, U.S. application Ser. No. 09/228379, filed on Jan. 12, 1999, now U.S. Pat. No. 6,345,113, issued on Feb. 5, 2002;

"Apparatus and method for detecting concealed objects in computed tomography data," invented by Sergey Simanovsky, et al., U.S. application Ser. No. 09/228,380, filed on Jan. 12, 1999, now U.S. Pat. No. 6,195,444, issued on Feb. 27, 2001;

"Method of and system for correcting scatter in a computed tomography scanner," invented by Ibrahim M. Bechwati, et al, U.S. application Ser. No. 10/121,466, filed on Apr. 11, 2002, now U.S. Pat. No. 6,687,326, issued on Feb. 3, 2004;

"Method of and system for reducing metal artifacts in images generated by x-ray scanning devices," invented by Ram Naidu, et al, U.S. application Ser. No. 10/171,116, filed on Jun. 13, 2002, now U.S. Pat. No. 6,721,387, issued on Apr. 13, 2004;

"Decomposition of Multi-Energy Scan Projections using Multi-Step Fitting," invented by Ram Naidu, et al, U.S. application Ser. No. 10/611,572, filed on Jul. 1, 2003;

"Method of and system for detecting threat objects using computed tomography images," invented by Zhengrong Ying, et al, U.S. application Ser. No. 10/831,909, filed on Apr. 26, 2004;

FIELD OF THE DISCLOSURE

The present disclosure relates generally to computed tomography (CT) scanners, and more specifically to a method of and a system for sharp object detection in carry-on/in luggage utilizing CT technology.

BACKGROUND OF THE DISCLOSURE

Most X-ray baggage scanning systems in use today are of the "line scanner" type and include a stationary X-ray source, a stationary linear detector array, and a conveyor belt for transporting baggage between the source and detector array as the baggage passes through the scanner. The X-ray source generates an X-ray beam that passes through and is partially attenuated by the baggage and is then received by the detector array. During each measuring interval the detector array generates data representative of the integral of density of the planar segment of the baggage through which the X-ray beam passes, and this data is used to form one or more raster lines of a two-dimensional image. As the conveyor belt transports the baggage past the stationary source and detector array, the scanner generates a two-dimensional image representative of the density of the baggage, as viewed by the stationary detector array. The density image is typically displayed for analysis by a human operator.

Detection of suspected baggage containing threat objects or prohibited items requires very attentive operators. The requirement for such attentiveness can result in greater operator fatigue, and fatigue as well as any distractions can result in a suspected bag passing through the system undetected. Accordingly, a great deal of effort has been made to design a better baggage scanner. Such designs, for example, have been described in U.S. Pat. No. 4,759,047 (Donges et al.); U.S. Pat. No. 4,884,289 (Glockmann et al.); U.S. Pat. No. 5,132,988 (Tsutsui et al.); U.S. Pat. No. 5,182,764 (Peschmann et al.); U.S. Pat. No. 5,247,561 (Kotowski); U.S. Pat. No. 5,319,547 (Krug et al.); U.S. Pat. No. 5,367,552 (Peschmann et al.); U.S. Pat. No. 5,490,218 (Krug et al.) and German Offenlegungsschrift DE 31 503 06 A1 (Heimann GmbH).

At least one of these designs, described in U.S. Pat. No. 5,182,764 (Peschmann et al.) and U.S. Pat. No. 5,367,552 (Peschmann et al.) (hereinafter the '764 and '552 patents), has been commercially developed and is referred to hereinafter as the "Invision Machine." The Invision Machine includes a CT scanner of the third generation type, which typically includes an X-ray source and an X-ray detector system secured respectively to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

The detector system can include a linear or two-dimensional array of detectors disposed as a single row or multiple rows in the shape of a circular, cylindrical or spherical arc having a center of curvature at the focal spot of the X-ray source, i.e., the point within the X-ray source from which the X-rays emanate. The X-ray source generates a fan or pyramidal shaped beam, or fan or cone beam, of X-rays that emanates from the focal spot, passes through a planar imaging field, and is received by the detectors. The CT scanner includes a coordinate system defined by X-, Y- and Z-axes, wherein the axes intersect and are all normal to one another at the center of rotation of the disk as the disk rotates about the rotation axis. This center of rotation is commonly referred to as the "isocenter." The Z-axis is defined by the rotation axis and the X- and Y-axes are defined by and lie within the planar imaging field. The fan beam is thus defined as the volume of space defined between a point source, i.e., the focal spot, and the receiving surfaces of the detectors of the detector array exposed to the X-ray beam. Because the dimension of the receiving surfaces of each of the detectors of the array of detectors is relatively small in the Z-axis direction the beam is designed to be relatively thin in the Z-axis direction. Each detector generates an output signal representative of the intensity of the X-rays incident on that detector. Since the X-rays are partially attenuated by all the mass in their path, the output signal generated by each detector is representative of the density of all the mass disposed in the imaging field between the X-ray source and that detector.

As the disk rotates, the detector array is periodically sampled, and for each measuring interval each of the detectors in the detector array generates an output signal representative of the density of a portion of the object being scanned during that interval. The collection of all of the output signals generated by all the detectors of the detector array for any measuring interval is referred to as a "projection," or equivalently as a "view," and the angular orientation of the disk (and the corresponding angular orientations of the X-ray source and the detector array) during generation of a projection is referred to as the "projection angle." At each projection angle, the path of the X-rays from the focal spot to each detector, called a "ray," increases in cross section from an appropriate point source to the receiving surface area of the detector, and thus is thought to magnify the density measurement because the receiving surface area of the detector area is larger than any cross sectional area of the object through which the ray passes.

As the disk rotates around the object being scanned, the scanner generates a plurality of projections at a corresponding plurality of projection angles. Using well known algorithms a CT image of the object may be generated from all the projection data collected at each of the projection angles. The CT image is representative of the density of a two dimensional "slice" of the object through which the fan beam has passed during the rotation of the disk through the various projection angles. The resolution of the CT image is determined in part by the width of the receiving surface area of each detector in the plane of the beam, the width of the detector being defined herein as the dimension measured in the same direction as the width of the beam, while the length of the detector is defined herein as the dimension measured in a direction normal to the beam parallel to the rotation or Z-axis of the scanner. In general, the resolution of the CT image is inversely proportional to the width of the receiving surface of each detector in the plane of the fan beam.

Referring to the drawings, FIGS. 1, 2 and 3 show perspective, end cross-sectional and radial cross-sectional views, respectively, of a typical baggage scanning system 100, which includes a conveyor system 110 for continuously conveying baggage or luggage 112 in a direction indicated by arrow 114 through a central aperture of a CT scanning system 120. The conveyor system includes motor driven belts for supporting the baggage. Conveyer system 110 is illustrated as including a plurality of individual conveyor sections 122; however, other forms of conveyor systems may be used.

The CT scanning system 120 includes an annular shaped rotating platform, or disk, 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," which is assigned to the present assignee and which is incorporated herein in its entirety by reference. Rotating platform 124 defines a central aperture 126 through which conveyor system 110 transports the baggage 112.

The system 120 includes an X-ray tube 128 and a detector array 130 which are disposed on diametrically opposite sides of the platform 124. The detector array 130 can be a two-dimensional array such as the array described in U.S. Pat. No. 6,091,795 entitled, "Area Detector Array for Computed Tomography Scanning System." The system 120 further includes a data acquisition system (DAS) 134 for receiving and processing signals generated by detector array 130, and an X-ray tube control system 136 for supplying power to, and otherwise controlling the operation of, X-ray tube 128. The system 120 is also preferably provided with a computerized system (not shown) for processing the output of the data acquisition system 134 and for generating the necessary signals for operating and controlling the system 120. The computerized system can also include a monitor for displaying information including generated images. System 120 also includes shields 138, which may be fabricated from lead, for example, for preventing radiation from propagating beyond gantry 125.

The X-ray tube 128 may generate a pyramidally shaped beam, often referred to as a "cone beam," 132 of X-rays that pass through a three dimensional imaging field, through which conveying system 110 transports baggage 112. After passing through the baggage disposed in the imaging field, detector array 130 receives cone beam 132 and generates signals representative of the densities of exposed portions of baggage 112. The beam therefore defines a scanning volume of space. Platform 124 rotates about its rotation axis 127, thereby transporting X-ray source 128 and detector array 130 in circular trajectories about baggage 112 as the conveyor system 110 continuously transports baggage through central aperture 126, so as to generate a plurality of projections at a corresponding plurality of projection angles.

In the assignee's CT baggage scanning system as described and claimed in the U.S. patent applications listed above and incorporated herein by reference, threat objects such as explosives are identified and classified in general by analyzing mass and/or density and/or shape of identified objects. Voxels in CT data for a piece of baggage are associated with density values. Voxels having density values within certain predetermined ranges of density can be identified and grouped together as objects. Using voxel volumes and densities, masses of identified objects are computed and are compared to mass thresholds. Analysis of this comparison and other predetermined parameters is used to determine whether the identified object can be classified as a threat object, i.e., an explosive.

In the assignee's system, a set of two-dimensional slices generated by the scanning system is automatically processed to locate threat objects. The processing generally includes three steps. First, each of the voxels is examined to determine if it could be part of a threat object. The main criterion used in making this determination is the density of the voxel. Next, a connected component labeling (CCL) approach is used to assemble the identified vokels into individual objects. Finally, discrimination, as described in assignees' co-pending application "Method of and system for detecting threat objects using computed tomography images" by Zhengrong Ying, et. al. U.S. application Ser. No. 10/831, 909, filed on Apr. 26, 2004, incorporated herein by reference, is used to determine if each of any identified objects can be classified as a threat. The main criterion used in this discrimination step is the shape histogram, which is invariant to translation, rotation, mirror, and scale changes.

However, current detection algorithms for detecting explosives or/and guns directly applied to the detection of sharp objects, such as knives, yield low detection rate and high false alarm rate due to the fact that sharp objects have different characteristics than other types of threats. Therefore there is a need for developing detection algorithms to take advantages of specific characteristics of sharp objects in the computed tomography images.

SUMMARY OF THE DISCLOSURE

The present disclosure is directed to a method of and a system for processing computed tomography (CT) data to identify sharp objects, such as knives, in checked, or/and carry on/in luggage or baggage. The disclosed method and system are applicable to an automatic baggage scanning system which can automatically detect objects and then discriminate objects to classify them as being threats or non-threats.

In accordance with one aspect of the disclosure, a three-dimensional (3D) CT image is generated by scanning a piece of baggage. A plurality of object voxels in the 3D CT image associated with an object is identified. In one embodiment, eigen-analysis is performed on the voxels corresponding to an identified object to yield eigen-vectors, which are ordered according to the associated eigen-values.

In one embodiment, at least one eigen-projection is generated by projecting the voxels of the identified object onto the plane perpendicular to the eigen-vector corresponding to the minimum eigen-value. The eigen-projection is a two-dimensional image with two indices: column index, and row index. The column index corresponds to the coordinate along the eigen-vector corresponding to the maximum eigen-value, and the row index corresponds to the coordinate along the eigen-vector corresponding to the medium eigen-value.

In accordance with one aspect of the disclosure, two features can be computed from the eigen-projection of an identified object. One feature is an axial concavity ratio, and the other is a pointness measurement. The axial concavity ratio measures the straightness of an object, and the pointness measurement represents and is a function of the sharpness of an end of a detected object.

In one embodiment, computing the axial concavity ratio comprises binarizing the eigen-projection image; calculating an object area; calculating an included area; calculating an axial concave area; and computing the axial concavity ratio.

In another embodiment, computing the pointness measurement comprises calculating a one-dimensional profile from the eigen-projection; computing a cumulative profile; calculating an extent of the one-dimensional profile; calculating two extent intercepts corresponding to 25% and 75% of the cumulative profile; and computing the pointness measurement as the larger of the two intercepts.

In accordance with one aspect of the disclosure, a feature, called flat area, is computed. This feature is based on the fact that the blade of a knife is, as a practical matter, a two-dimensional object, and more precisely a three-dimensional object with very small extent on one of the three dimensions. In computing the flat area, a minimal coordinate matrix and a maximal coordinate matrix are first computed along the eigen-vector corresponding to the smallest eigen-value. Filtering the minimal and maximal coordinate matrices is then performed. The extent of the object along the eigen-vector corresponding to the smallest eigen-value is calculated from the filtered minimal and maximal coordinate matrices, yielding an extent projection. The flat area is the number of pixels on the extent projection, which is less than a pre-defined threshold.

In accordance with one aspect of the disclosure, a quadratic function is used to calculate penalty scores associated with the flat area, the axial concavity ratio, and the pointness measurement. In one embodiment, a sharpness score is computed by multiplying all the penalty scores together. A sharpness score can also be only the penalty score of the flat area or the penalty score of the pointness measurement.

In accordance with one aspect of the disclosure, the identified object is detected as a sharp object if the calculated sharpness score is greater than a pre-defined threshold.

The disclosed sharp object detection method provides substantial improvement in automatic object identification, classification and/or discrimination in CT scanning systems. Particularly, the three features, namely, the flat area, the axial concavity ratio, and the pointness measurement, which are specific to sharp objects, such as knives, improve the discriminating capability of the system in addition to the use of mass and density features. By providing a method by which the features specific to sharp objects are extracted and used by the discrimination system, the overall detection rate of the system and overall false alarm rate of the system can be greatly improved.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE DRAWINGS

In accordance with the present disclosure, an algorithm for detecting sharp objects, such as knives, using CT images is provided. The algorithm uses features, which are specific to sharp objects in the CT images, in addition to measurements of mass and density for detection. These features are cascaded by using quadratic penalty functions to yield a sharpness score. The sharpness score is compared with a pre-defined threshold to detect the presence of a sharp object.

Figure 3:
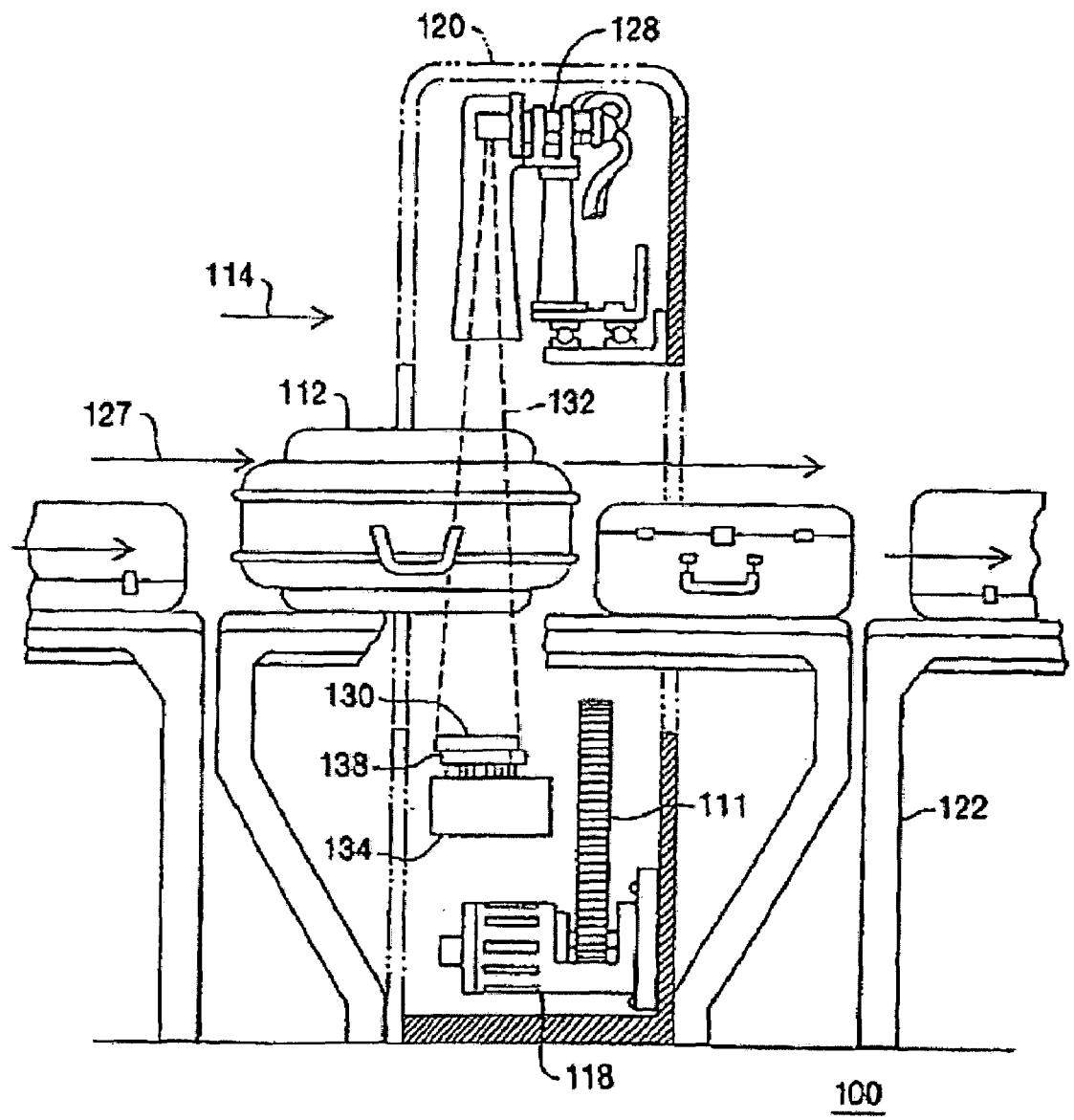
FIG. 3 is a cross-sectional radial view of the system of FIG. 1.
Figure 4:
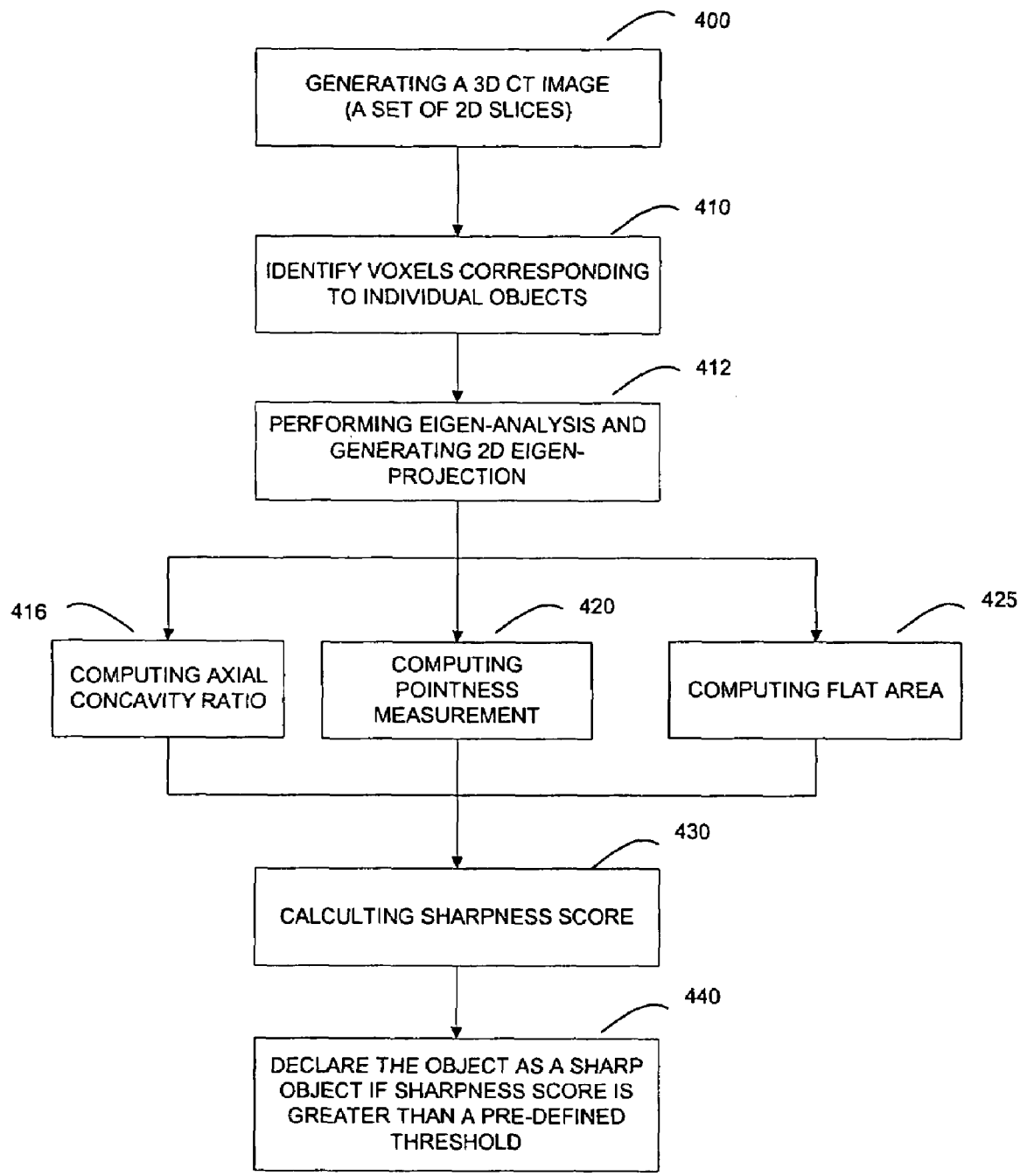
FIG. 4 contains a top-level flow diagram which illustrates the logical flow of one embodiment of sharp object detection of the present disclosure.

FIG. 4 contains a schematic flow diagram which illustrates the preferred embodiment of the logical flow of the process of detecting a sharp object using 3D CT images. At step 400, a 3D CT image with size of I×J×K voxels, denoted as A(i,j,k), i=0, . . . , I−1, j=0, . . . , J−1, k=0, . . . , K−1, is generated when a piece of luggage or baggage passes through the scanner, similar to the one described herein in connection with FIGS. 1-3. Each voxel represents a spatial volume of $\Delta x \times \Delta y \times z$, and has an associated CT number representing the density of contained objects in the scanned luggage.

Next, at Step 410 of FIG. 4, a 3D morphological operation called erosion described in U.S. Pat. No. 6,075,871 (Simanovsky, et al.), and incorporated herein by reference, is preferably used to separate some thinly connected objects in the similar density range. The connected component labeling (CCL) method is then applied to group the connected voxels with CT numbers no less than a predefined number, for example, 1000 Hounsfield Unit (HU), into objects. This results in a label image, denoted as L(i,j,k), which has the same size as the CT image. In the label image L(i,j,k), value zero represents the background of the image, and an identified object is a plurality of voxels which has same non-zero number. For example, all the voxels with value five in the label image corresponds to one identified object. To simplify the description, for the purposes of exposition only, a single object will be referred to hereinafter. However, it will be understood that the description is applicable to data in which multiple objects are identified.

Next, at Step 412 of FIG. 4, eigen-analysis is performed and an eigen-projection is generated on an identified object. The details of the description of eigen-analysis and eigen-projection generation are described in the assignee's U.S. Pat. No. 6,345,113 (Carl R. Crawford et al), incorporated herein by reference. The output of the eigen-analysis includes the centroid of the object, denoted as $v_c=[x_c,y_c,z_c]^T$, the three ordered eigen-values, denoted as $e_0 \geq e_1 \geq e_2$, the corresponding three eigen-vectors, denoted as $v_0$, $v_1$, and $v_2$, and an eigen-projection image. The eigen-projection image is perpendicular to the eigen-vector $v_2$, which corresponds to the smallest eigen-value from the voxels corresponding to the identified object. This projection image is referred to herein as the eigen-projection. The eigen-projection contains the shape information of the object. Denote P(r,c) r=0, ... , R−1, and c=0, ..., C−1, as the two dimensional (2D) eigen-projection image of an identified object with size of R rows and C columns. Note that the row index r corresponds to the coordinates associated with eigen-vector $v_1$, and the column index c corresponds to the coordinates associated with eigen-vector $v_0$. The result of such an arrangement of the indices is that the projected object has longer extent along the column index c and has shorter extent along the row index r. In the projection image, each pixel value P(r,c) represents the number of voxels of the object along the eigen-vector $v_2$ of the object; and value zero represents the background in the eigen-projection image. In the following, two features, an axial concavity ratio and a pointness measurement, are calculated from the eigen-projection image.

At Step 416 of FIG. 4, an axial concavity ratio is computed. An axial concavity ratio, denoted as $Q_c$, measures the straightness of an object in its 2D eigen-projection image and is calculated as follows. Binarization is first performed on the eigen-projection image P(r,c). Denote B(r,c) as the binary projection image, and is calculated as follows, $$B(r, c) = \begin{cases} 1 & \text{if } P(r, c) > 0 \\ 0 & \text{otherwise} \end{cases}$$

For each row r, find the minimum column index $c_{min}(r)$ and the maximum column index $c_{max}(r)$ of the object as follows, $$c_{\min}(r) = \min_{\{c|B(r,c)=1\}} c$$

$$c_{\max}(r) = \max_{\{c|B(r,c)=1\}} c$$

$A_{object}$ is denoted as the object projection area, which is the number of non-zero pixels of the eigen-projection image, and is calculated as follows, $$A_{object} = \sum_{r=0}^{R-1} \sum_{c=0}^{C-1} B(r, c)$$

$A_{included}$ is denoted as the included area by the identified object in the eigen-projection image, and is calculated as follows, $$A_{included} = \sum_{r=0}^{R-1} (c_{\max}(r) - c_{\min}(r) + 1)$$

The axial concave area, denoted as $A_{concave}$, is calculated as follows, $$A_{concave} = A_{included} - A_{object}$$

The axial concavity ratio $Q_c$ is calculated as follows, $$Q_c = \frac{A_{concave}}{A_{object}}$$

Figure 5A:
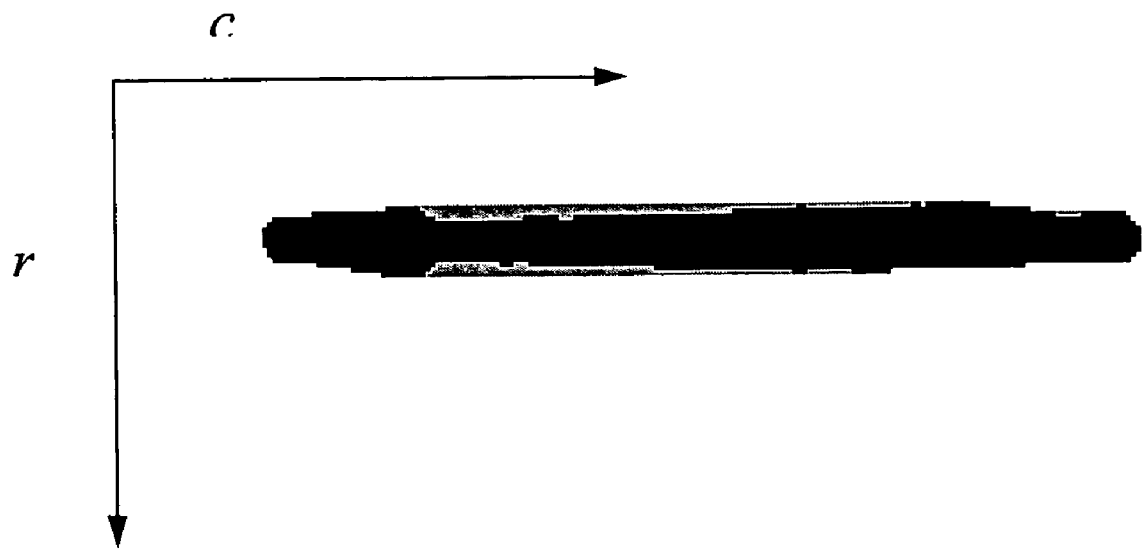
FIG. 5A shows an eigen-projection image of a dagger in computing the axial concavity ratio of the present disclosure.
Figure 5B:
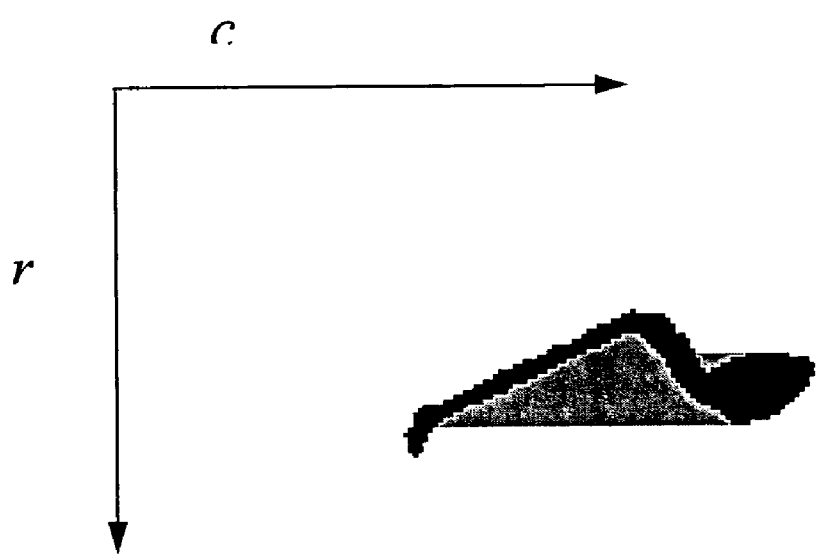
FIG. 5B shows an eigen-projection image of a portion of a suitcase handle in computing the axial concavity ratio of the present disclosure.

Thus, the axial concavity ratio $Q_c$ is the ratio of the axial concave area to the object area in the eigen-projection image. For a straight object, the concave area is close to zero, and therefore $Q_c$ is close to zero. For any non-straight object, the concave area can be large, even can be larger than the area of the object itself, resulting in a larger value of $Q_c$. FIG. 5A shows an eigen-projection image of a dagger with a metal tipped sheath, and FIG. 5B shows an eigen-projection image of a portion of a suitcase handle. The dark area is the object area, and the gray area is the axial concave area.

Next at Step 420 of FIG. 4, a feature called pointness measurement is preferably computed in the eigen-projection image. In the eigen-projection image P(r,c), a knife-like object has a long extent along the column index c, and a short extent along the row index r. The pointness measurement $Q_p$ measures the sharpness of two ends of an object along the column index in the eigen-projection image. The details of calculating a pointness measurement are described below. The first step is to project the two-dimensional projection image P(r,c) into a one-dimensional profile U(r) as follows, $$U(r) = \sum_{c=0}^{C-1} P(r, c)$$

A cumulative profile V(r) is then calculated from the profile U(r) as follows, $$V(r) = \frac{1}{W} \sum_{r'=0}^{r} U(r')$$

where $$W = \sum_{r=0}^{R-1} U(r)$$

The extent of the object in the one-dimensional profile $d_{ext}$ is calculated as follows, $$d_{ext} = r_{\max} - r_{\min} + 1$$

where $$r_{\min} = \min_{\{r|U(r)>0\}} r$$

$$r_{\max} = \max_{\{r|U(r)>0\}} r$$

The indexes $r_{lower}$ and $r_{upper}$, corresponding to the 0.25 (25%) and 0.75 (75%) intercepts of the cumulative profile V(r) respectively, are computed as follows, $$r_{lower} = \min_{\{r|V(r)>0.25\}} r$$

$$r_{upper} = \max_{\{r|V(r)<0.75\}} r$$

The indexes $r_{lower}$ and $r_{upper}$ are then normalized by the extent of the one-dimensional profile $d_{ext}$ as follows, $$q_{lower} = \frac{r_{lower} - r_{min}}{d_{ext}}$$

$$q_{upper} = 1 - \frac{r_{upper} - r_{min}}{d_{ext}}$$

Finally the pointness measurement $Q_p$ is the larger of the above two quantities, $$Q_p = \max(q_{lower}, q_{upper})$$

The larger the pointness measurement $Q_p$ is, the sharper the object is.

Next, at Step 425 of FIG. 4, a feature specific to sharp objects, such as knives, called flat area $Q_b$, is calculated. This feature is motivated by the fact that the blade of a knife is, as a practical matter, a two-dimensional object, and more precisely, a three-dimensional object with very small extent on one of the three dimensions. The flat area measures the size of a 3D object region which collapses into a flat 2D region, and will be mathematically described later.

In computing the flat area, the eigen-projection is not used. The reason is that the eigen-projection image can not tell the difference between a knife blade and a hollow tube when they occupy the same number of voxels along a projection vector. However, these two objects have different extents on a projection vector: the knife blade has smaller extent along the direction perpendicular to the blade surface; and the tube has larger extent on any projection direction.

An extent projection, which is a modified version of eigen-projection, is calculated to compute the flat area. The extent projection projects the extent of a 3D object along the eigen-vector corresponding to the minimum eigen-value, rather than projects the number of voxels occupied by the object as the eigen-projection does. The flat area is the number of pixels in the extent projection, whose values are less than a pre-defined threshold.

Let $\Delta e$ be the grid size of the extent projection, and $E_b \times E_b$ be the size of the extent projection. $E_b$ is calculated as follows, $$E_b = \frac{\sqrt{(I\Delta x)^2 + (J\Delta y)^2 + (K\Delta z)^2}}{\Delta e}$$

Any pixel value in the extent projection image of a 3D object is the extent of the object along the eigen-vector $v_2$. An extent is defined by a minimal coordinate and a maximal coordinate along the eigen-vector $v_2$, therefore, two matrices $P_{min}(r,c)$, $r,c = 0, \ldots, E_b - 1$, denoted as the minimal coordinate matrix; and $P_{max}(r,c)$, $r,c = 0, \ldots, E_b - 1$, denoted as the maximal coordinate are introduced. The minimal coordinate matrix is the lower bounding surface of the object to be projected, and the maximal coordinate matrix is the upper bounding surface of the object.

The minimal and maximal coordinate matrices are first initialized as follows, $$P_{min}(r,c) = I + J + K$$

$$P_{max}(r,c) = -I - J - K$$

For each voxel with indices (i,j,k) of the identified object, the following steps are performed to calculate the minimal and maximal coordinate matrices $P_{min}(r,c)$ and $P_{max}(r,c)$.

(a) Subtracting the centroid of the object from the voxel coordinates as follows, $$v = \begin{bmatrix} i\Delta x \\ j\Delta y \\ k\Delta z \end{bmatrix} - v_c$$

(b) Calculating the coordinates along the eigen-vectors as follows, $$x' = v^T v_1$$

$$y' = v^T v_0$$

$$z' = v^T v_2$$

(c) Calculating the indices associated with the first two coordinates x' and y', $$r = \left\lfloor \frac{x'}{\Delta e} + \frac{E_b}{2} \right\rfloor$$

$$c = \left\lfloor \frac{y'}{\Delta e} + \frac{E_b}{2} \right\rfloor$$

where $\lfloor x \rfloor$ denotes the greatest integer which is not larger than x.

(d) Updating the minimal and maximal coordinate matrices as follows, $$P_{min}(r,c) = \min(P_{min}(r,c), z')$$

$$P_{max}(r,c) = \max(P_{max}(r,c), z')$$

After all the voxels of the identified object are traversed once, each entry of the minimal coordinate matrix corresponds to the minimal z' coordinate of the identified object; and each entry of the maximal coordinate matrix corresponds to the maximal z' coordinate of the identified object.

Still at Step 425 of FIG. 4 in computing the flat area of an identified object, filtering is then applied to the minimal and maximal coordinate matrices $P_{min}(r,c)$ and $P_{max}(r,c)$ using a 3×3 neighborhood N(r,c), which is defined as follows, $$N(r,c) = \left\{ \begin{array}{c} (r-1, c-1), (r-1, c), (r-1, c+1), \\ (r, c-1), (r, c), (r, c+1), \\ (r+1, c-1), (r+1, c), (r+1, c+1) \end{array} \right\}$$

The filtering is to smooth out high-frequency noise in the two bounding surfaces of an object, represented by $P_{min}(r,c)$ and $P_{min}(r,c)$. The filtered matrices are denoted as $P'_{min}(r,c)$ and $P'_{max}(r,c)$, and are computed as follows, $$P'_{min}(r,c) = \min_{(r',c') \in N(r,c)} P_{min}(r', c')$$

$$P'_{max}(r,c) = \max_{(r',c') \in N(r,c)} P_{min}(r', c')$$

Note that border repetition scheme is used for the boundaries, that is, $$P_{min}(r,c) = P_{min}(0,c), \text{ if } r < 0$$

$$P_{min}(r,c) = P_{min}(E_b - 1, c), \text{ if } r \geq E_b$$

The same applies to the column index c. The border repetition scheme is also used for the maximal coordinate matrix $P_{max}(r,c)$.

Finally, the flat area $Q_b$ is computed from the extent projection as follows, $$Q_b = \sum_{r=0}^{E_b-1} \sum_{c=0}^{E_b-1} P_{extent}(r, c)$$

where the extent projection $P_{extent}(r,c)$ of the identified object is calculated as follows, $$P_{extent}(r, c) = \begin{cases} 1 & \text{if } 0 \leq P'_{max}(r, c) - P'_{min}(r, c) \leq \Theta_{flat} \\ 0 & \text{otherwise} \end{cases}$$

where $\Theta_{flat}$ is a pre-defined threshold, and its value is experimentally determined. For example, $\Theta_{flat}=10$ yields satisfactory results in the assignee's scanner system, similar to the one shown in FIGS. 1-3.

Figure 6:
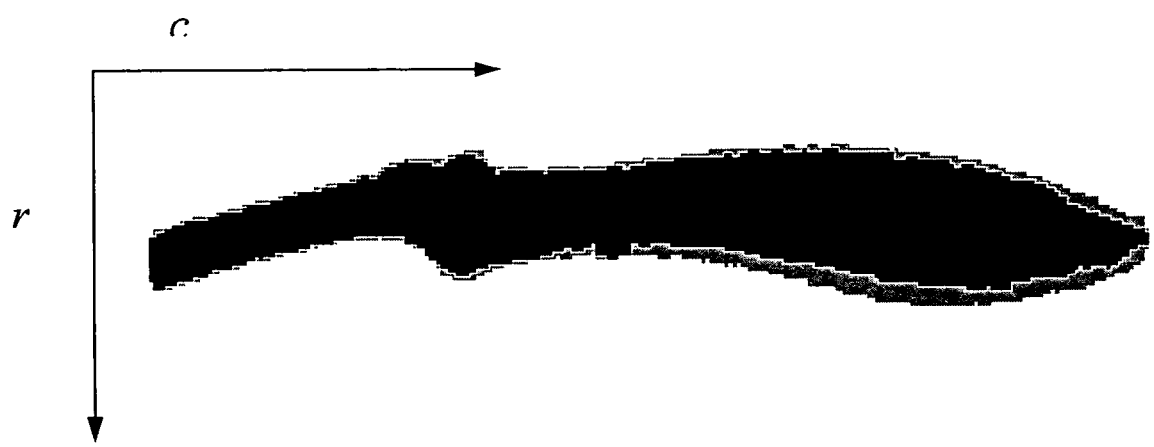
FIG. 6 shows an extent projection image in computing the flat area in accordance with the teachings of the present disclosure.

FIG. 6 shows an example of the extent projection $P_{extent}(r,c)$; the "gray" area corresponds to the flat area of the object ("ones" in the extent projection); and the "dark" area corresponds to non-flat area of the object ("zeros" in the extent projection). The value of the flat area is the number of pixels of the "gray" area, which corresponds to the flat area of the knife of FIG. 6.

Next at Step 430 of FIG. 4, a sharpness score is preferably calculated from the three computed features: the axial concavity ratio, the pointness measurement, and the flat area. The sharpness score, denoted as $S_{sharp}$, is calculated as follows, $$S_{sharp} = F_{concavity} \times F_{pointness} \times F_{flat}$$

where $F_{concavity}$ is a penalty score calculated using the axial concavity ratio $Q_c$, $F_{pointness}$ is a penalty score calculated using the pointness measurement $Q_p$, and $F_{flat}$ is a penalty score calculated using the flat area $Q_b$.

Figure 1:
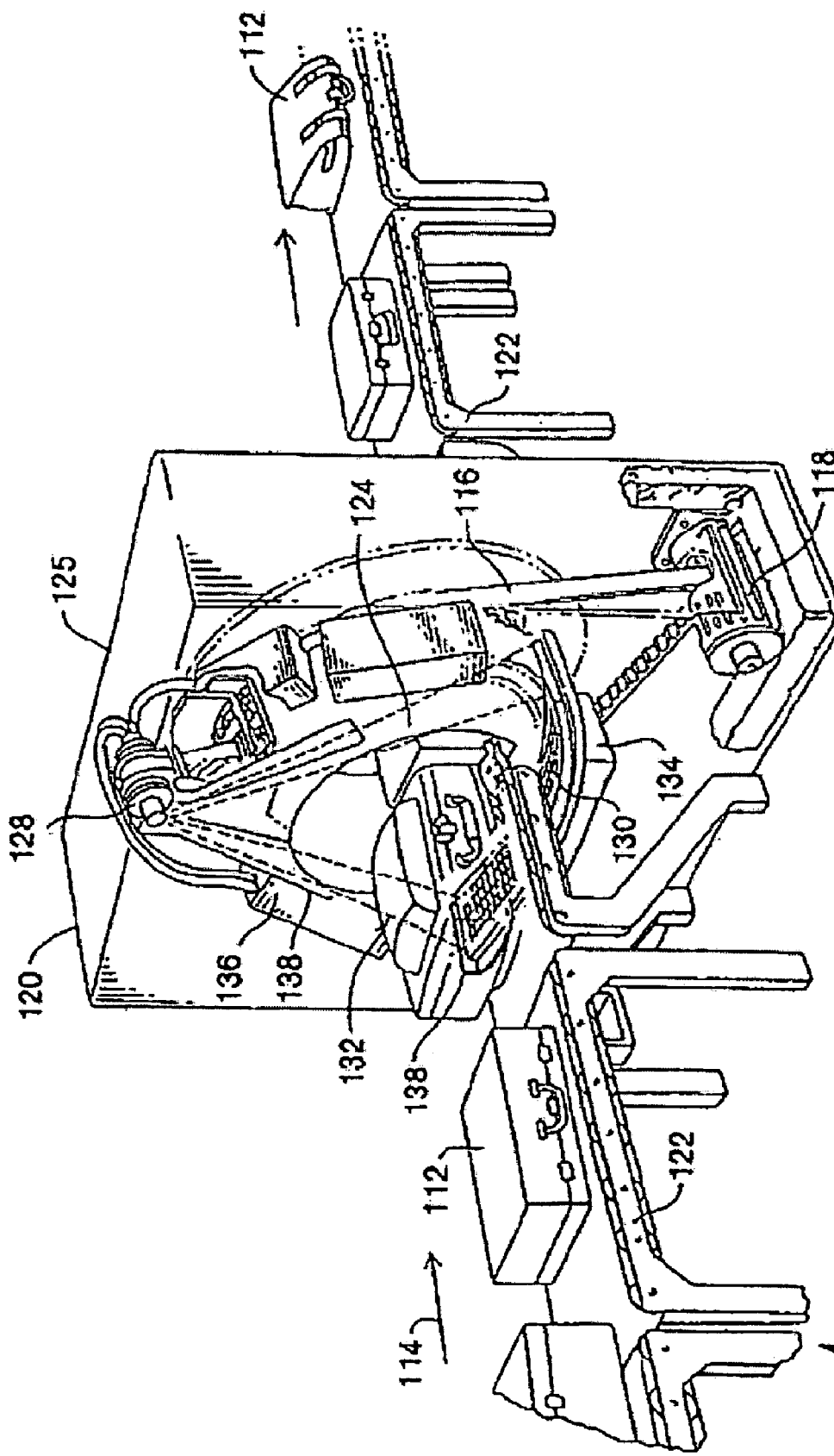
FIG. 1 is a perspective view of a baggage scanning system, known in the prior art.
Figure 2:
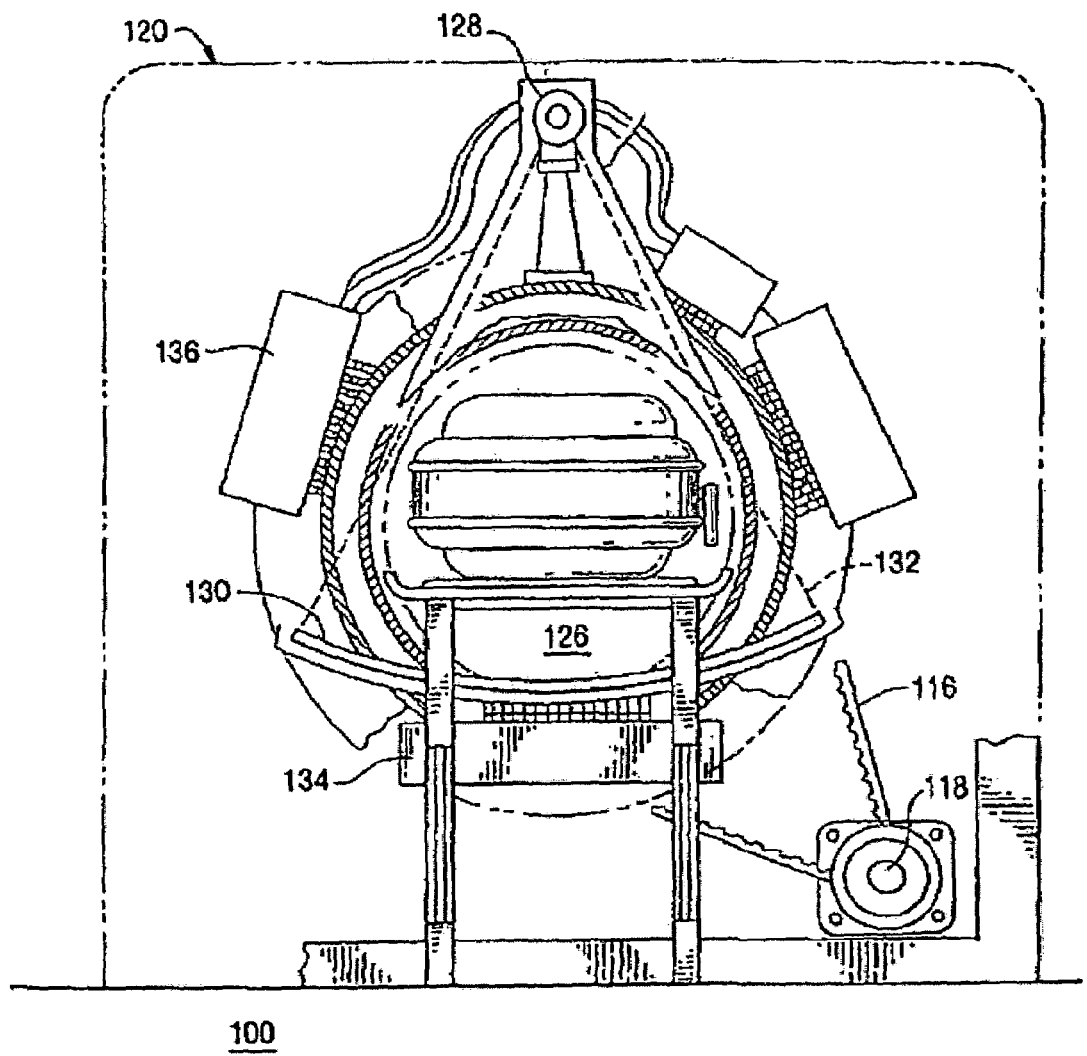
FIG. 2 is a cross-sectional end view of the system of FIG. 1.

The penalty score $F_{concavity}$ of the axial concavity ratio $Q_c$ is calculated as follows, $$F_{concavity} = \begin{cases} 1, & Q_c \leq \theta_c \\ 1 - \left(\frac{Q_c - \theta_c}{w_c}\right)^2, & \theta_c < Q_c < (\theta_c + w_c) \\ 0, & Q_c \geq (\theta_c + w_c) \end{cases}$$

where $\theta_c$ and $w_c$ are pre-defined constants, and they are experimentally determined, for example, $\theta_c=0.3$ and $w_c=0.05$ yield satisfactory results in the assignee's scanner system as shown in FIGS. 1, 2, and 3.

The penalty score $F_{pointness}$ of the pointness measurement $Q_p$ is calculated as follows, $$F_{pointness} = \begin{cases} 0, & Q_p \leq \theta_p - w_p \\ 1 - \left(\frac{Q_p - \theta_p}{w_p}\right)^2, & \theta_p - w_p < Q_p < \theta_p \\ 1, & Q_p \geq \theta_p \end{cases}$$

where $\theta_p$ and $w_p$ are pre-defined constants, and they are experimentally determined, for example, $\theta_p=0.3$ and $w_p=0.1$ yield satisfactory results in the assignee's scanner system, similar to the one shown in FIGS. 1, 2, and 3.

The penalty score $F_{flat}$ of the flat area $Q_b$ is calculated as follows, $$F_{flat} = \begin{cases} 0, & Q_b \leq \theta_b - w_b \\ 1 - \left(\frac{Q_b - \theta_b}{w_b}\right)^2, & \theta_b - w_b < Q_b < \theta_b \\ 1, & Q_b \geq \theta_b \end{cases}$$

where $\theta_b$ and $w_b$ are pre-defined constants, and they are experimentally determined. For example, $\theta_b=300$ and $w_b=150$ yield satisfactory results in the assignee's scanner system, similar to the one shown in FIGS. 1, 2, 3.

Finally at Step 440 of FIG. 4, a threat is detected if the calculated sharpness score is greater than a pre-defined threshold, as follows, $$\text{an identified object} = \begin{cases} \text{a sharp object} & \text{if } S_{sharp} \geq \theta_{sharp} \\ \text{not a sharp object} & \text{otherwise} \end{cases}$$

where $\theta_{sharp}$ is a pre-defined threshold, and is experimentally determined. For example, $\theta_{sharp}=0.5$ yields satisfactory results in the assignee's scanner system, similar to the one shown in FIGS. 1, 2, and 3.

A system for sharp object detection using CT images that includes subsystems configured and arranged to implement the above functionality may also be provided. Such a system may include subsystems for generating 3D CT images, identifying voxels corresponding to individual objects, performing an eigen-analysis and generating an eigen-projection on an identified object, computing an axial concavity ratio, computing a pointness measurement, computing a flat area, computing a sharpness score, and detecting a threat if the calculated sharpness score is greater than a pre-defined threshold.

While this disclosure has been particularly shown and described with references to preferred embodiments thereof, it will be understood by those skilled in the art that various changes in form and details may be made therein without departing from the spirit and scope of the disclosure as defined by the following claims. Such variations include using any combinations of the three features for detection. For example, the pointness measurement with or without the axial concavity ratio can be used for detecting one type of sharp objects, such as pointed objects, and the flat area with or without the axial concavity ratio can be used for detecting another type of sharp objects, such as cutting objects. Such variations also include a low-pass filtering of data representing the generated eigen-projection images.

The invention claimed is:

1. A method of sharp object detection represented in three-dimensional reconstructed computed tomography data, wherein the three-dimensional tomography data includes a plurality of voxels, comprising:
   A. Identifying voxels corresponding to individual objects;
   B. Performing an eigen-analysis and generating an eigen-projection of the voxels corresponding to an identified object;
   C. Calculating a sharpness score of the identified object; and
   D. Declaring the identified object as a sharp object if the sharpness score is greater than a pre-defined threshold.

2. The method of claim 1, wherein Step C includes calculating a pointness measurement of the identified object.

3. The method of claim 2, wherein calculating a pointness measurement of the identified object comprises:
   A. Calculating a one-dimensional profile from the eigen-projection;
   B. Computing a cumulative profile;
   C. Calculating an extent of the one-dimensional profile;
   D. Calculating two intercepts relative to the profile extent corresponding to 25% and 75% of the cumulative profile; and
   E. Calculating the pointness measurement by finding the larger of the two intercepts.

4. The method of claim 1, wherein Step C includes calculating a flat area of the identified object.

5. The method of claim 4, wherein calculating a flat area of identified object comprises:
   A. Calculating a minimal coordinate matrix and a maximal coordinate matrix;
   B. Filtering the minimal and maximal coordinate matrices;
   C. Computing the extent projection from the filtered minimal and maximal coordinate matrices; and
   D. Computing a flat area from the extent projection.

6. The method of claim 1, wherein Step C includes calculating an axial concavity ratio of the identified object.

7. The method of claim 6, wherein calculating an axial concavity ratio of the identified object comprises:
   A. Binarizing the eigen-projection image;
   B. Calculating an object area;
   C. Calculating an included area;
   D. Calculating an axial concave area; and
   E. Computing the axial concavity ratio.

8. A system for sharp object detection represented in three-dimensional reconstructed computed tomography data, wherein the three-dimensional tomography data includes a plurality of voxels, comprising:
   A. A subsystem constructed and arranged so as to identify voxels corresponding to individual objects;
   B. A subsystem constructed and arranged so as to perform an eigen-analysis and generate an eigen-projection of the voxels corresponding to an identified object;
   C. A subsystem constructed and arranged so as to calculate a sharpness score of the identified object; and
   D. A subsystem constructed and arranged so as to declare the identified object as a sharp object if the sharpness score is greater than a pre-defined threshold.

9. The system of claim 8, wherein the subsystem C includes a module constructed and arranged so as to calculate a pointness measurement of the identified object.

10. The system of claim 9, wherein the module for calculating a pointness measurement of the identified object comprises:
    A. An element constructed and arranged so as to calculate a one-dimensional profile from the eigen-projection;
    B. An element constructed and arranged so as to compute a cumulative profile;
    C. An element constructed and arranged so as to calculate an extent of the one-dimensional profile;
    D. An element constructed and arranged so as to calculate two intercepts relative to the profile extent corresponding to 25% and 75% of the cumulative profile; and
    E. An element constructed and arranged so as to calculate the pointness measurement by finding the larger of two intercepts.

11. The system of claim 8, wherein the subsystem C includes a module constructed and arranged so as to calculate a flat area of the identified object.

12. The system of claim 11, wherein the module for calculating a flat area of identified object comprises:
    A. An element constructed and arranged so as to calculate a minimal coordinate matrix and a maximal coordinate matrix;
    B. An element constructed and arranged so as to filter the minimal and maximal coordinate matrices;
    C. An element constructed and arranged so as to compute the extent projection from the filtered minimal and maximal coordinate matrices; and
    D. An element constructed and arranged so as to compute a flat area from the extent projection.

13. The system of claim 8, wherein the subsystem C includes a module constructed and arranged so as to calculate an axial concavity ratio of the identified object.

14. The system of claim 13, wherein the module for calculating an axial concavity ratio of the identified object comprises:
    A. An element constructed and arranged so as to binarize the eigen-projection image;
    B. An element constructed and arranged so as to calculate an object area;
    C. An element constructed and arranged so as to calculate an included area;
    D. An element constructed and arranged so as to calculate an axial concave area; and
    E. An element constructed and arranged so as to compute the axial concavity ratio.

* * * * *